(12) United States Patent
Lin

(10) Patent No.: US 12,468,160 B2
(45) Date of Patent: Nov. 11, 2025

(54) HEAD-MOUNTED DISPLAY DEVICE AND HEADBAND ADJUSTING MODULE THEREOF

(71) Applicant: CHENG UEI PRECISION INDUSTRY CO., LTD., New Taipei (TW)

(72) Inventor: Chin-Chung Lin, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 18/827,832

(22) Filed: Sep. 8, 2024

(65) Prior Publication Data

US 2025/0208426 A1 Jun. 26, 2025

(51) Int. Cl.
*G02B 27/01* (2006.01)
(52) U.S. Cl.
CPC ................. *G02B 27/0176* (2013.01)
(58) Field of Classification Search
CPC ................................................ G02B 27/0176
See application file for complete search history.

(56) References Cited

U.S. PATENT DOCUMENTS

2019/0324280 A1\* 10/2019 Yildiz ............... G02B 27/0176
2025/0052366 A1\* 2/2025 Tompkins ............ A44C 5/0053

\* cited by examiner

Primary Examiner — Kwang-Su Yang
(74) Attorney, Agent, or Firm — Cheng-Ju Chiang

(57) ABSTRACT

A head-mounted display device includes a displayer, and a headband adjusting module connected to the displayer. The headband adjusting module includes a base, a radial baffle, a first headband, a second headband and a knob. One end of the first headband is defined as a first adjusting end which has a first adjusting groove. A single inner wall of the first adjusting groove protrudes inward to form a first rack. One end of the second headband is defined as a second adjusting end which has a second adjusting groove. A single inner wall of the second adjusting groove protrudes inward to form a second rack. The first adjusting groove and the second adjusting groove are disposed overlapping each other. The first rack is opposite to the second rack. A bending direction of the first rack is the same as a bending direction of the second rack.

15 Claims, 9 Drawing Sheets

HEAD-MOUNTED DISPLAY DEVICE AND HEADBAND ADJUSTING MODULE THEREOF

CROSS REFERENCE TO RELATED APPLICATIONS

The present application is based on, and claims priority from, China Patent Application No. 202323423200.1, filed Dec. 25, 2023, the disclosure of which is hereby incorporated by reference herein in its entirety.

BACKGROUND OF THE INVENTION

Field of the Invention

The present invention generally relates to a head-mounted display device, and more particularly to a head-mounted display device with a headband adjusting module adjusting a length of a headband, and preventing the headband from loosening.

Description of Related Art

Generally, a head-mounted display device is able to be used in a virtual reality (VR), an augmented reality (AR), a mixed reality (MR), etc. The virtual reality constructs a highly realistic 3D (Three Dimensional) virtual world by use of a computer simulation way. The augmented reality projects virtual elements into a reality by use of a projection way or a camera combination way. A technology of the mixed reality combines both a VR technology and an AR technology. With the advancement of sciences and technologies, the head-mounted display devices are becoming more and more popular in applications of a medicine field, a military field, an entertainment field, an education field and other fields. In order to adapt to head sizes of different users, the head-mounted display devices are usually equipped with headband adjusting modules for adjusting lengths of headbands, so that the users may easily adjust the headbands by themselves to the appropriate lengths for enhancing wearing comfort levels of the users.

A conventional head-mounted display device is used in the virtual reality for wearing on a head of the user. The conventional head-mounted display device includes a body, a supporting arm assembly and a knob. The supporting arm assembly includes a first arm and a second arm. One end of the first arm and one end of the second arm are located to two opposite sides of the body, respectively. The other end of the first arm and the other end of the second arm respectively have a first tooth portion and a second tooth portion overlapping each other. The knob is equipped with a gear. The first tooth portion and the second tooth portion disposed at an upper side and a lower side of the gear. The first tooth portion and the second tooth portion are engaged with the gear. When the user rotates the knob, the gear drives the first tooth portion and the second tooth portion to relatively move to change an overlapping degree of the first tooth portion and the second tooth portion, so an overall length of the supporting arm assembly is adjusted.

However, although this structural design achieves a purpose of adjusting the overall length of the supporting arm assembly, an interlocking structure for mutually limiting the knob and the supporting arm assembly is lacked, so the knob is susceptible to an external force to cause an unintended rotation, and a loosening problem of the supporting arm assembly is caused after the length of the supporting arm assembly is adjusted. As a result, an inconvenient use of the supporting arm assembly is caused in use.

In view of the above-mentioned drawbacks, it is necessary to provide an innovative head-mounted display device with a headband adjusting module adjusting a length of a headband, and preventing the headband from loosening.

BRIEF SUMMARY OF THE INVENTION

An object of the present invention is to provide a headband adjusting module adjusting a length of a headband, and preventing the headband from loosening. The headband adjusting module, comprising: a main body having a through hole longitudinally penetrating through a middle of the main body, an outer surface of an outer wall of the main body protruding outward to form a pivoting tube, the pivoting tube being hollow, a front and a rear of the pivoting tube being opened freely, the pivoting tube having at least one pawl formed on an outer surface of the pivoting tube, a middle of the pivoting tube being corresponding to the through hole, and the middle of the pivoting tube being communicated with the through hole; a radial baffle, a middle of a top of the radial baffle being recessed downward to form an opening slot, the radial baffle being equipped with a fastener for fastening the main body with the radial baffle; a first headband, one end of the first headband being defined as a first adjusting end, the first adjusting end having a first adjusting groove penetrating through an outer surface and an inner surface of the first headband, several portions of a single inner wall of the first adjusting groove protruding inward to form a first rack; a second headband, one end of the second headband being defined as a second adjusting end, the first adjusting end and the second adjusting end being overlapped, and the first adjusting end and the second adjusting end being movably disposed between the main body and the radial baffle, the second adjusting end having a second adjusting groove penetrating through an outer surface and an inner surface of the second headband, several portions of a single inner wall of the second adjusting groove protruding inward to form a second rack, the first adjusting groove of the first headband and the second adjusting groove of the second headband being disposed overlapping each other, the first rack being opposite to the second rack, a bending direction of the first rack being the same as a bending direction of the second rack; and a knob having a grip and an actuating shaft, an inner portion of the grip having a receiving space penetrating through an inner surface of the grip, the actuating shaft being connected to a middle of an inner surface of a rear wall of the receiving space, the actuating shaft passing through the pivoting tube and the through hole, the pivoting tube being received in the receiving space, at least one portion of an inner surface of a peripheral wall of the receiving space being recessed opposite to the actuating shaft to form at least one buckling groove, the at least one pawl being matched with the at least one buckling groove, the at least one pawl being fastened in the at least one buckling groove, the actuating shaft having a gear arranged at one end of the actuating shaft, a ring groove recessed inward in an outer surface of the actuating shaft, and a fastening rod surrounded by the ring groove, the first rack of the first headband and the second rack of the second headband being both engaged with the gear, the fastening rod being fastened to the opening slot, wherein the first headband and the second headband together surround a wearing space, an overlapping extent of the first headband and the second headband is changed by rotating the knob, so a size of the wearing space is adjusted.

Another object of the present invention is to provide a head-mounted display device. The head-mounted display device, comprising: a displayer; a main body having a through hole longitudinally penetrating through a middle of the main body, an outer surface of an outer wall of the main body protruding outward to form a pivoting tube, the pivoting tube being hollow, a front and a rear of the pivoting tube being opened freely, the pivoting tube having at least one pawl formed on an outer surface of the pivoting tube, a middle of the pivoting tube being communicated with the through hole; a radial baffle, a middle of a top of the radial baffle being recessed downward to form an opening slot; a first headband, one end of the first headband being defined as a first adjusting end, and the other end of the first headband being defined as a first connecting end, the first adjusting end having a first adjusting groove penetrating through an outer surface and an inner surface of the first headband, several portions of a single inner wall of the first adjusting groove protruding inward to form a first rack; a second headband, one end of the second headband being defined as a second adjusting end, and the other end of the second headband being defined as a second connecting end, the first adjusting end and the second adjusting end being overlapped, and the first adjusting end and the second adjusting end being movably disposed between the main body and the radial baffle, the second adjusting end having a second adjusting groove penetrating through an outer surface and an inner surface of the second headband, several portions of a single inner wall of the second adjusting groove protruding inward to form a second rack, the first adjusting groove of the first headband and the second adjusting groove of the second headband being disposed overlapping each other, the first rack being opposite to the second rack, a bending direction of the first rack being the same as a bending direction of the second rack, the first connecting end and the second connecting end being connected to two opposite sides of the displayer; and a knob having a grip, and an actuating shaft formed in an inner portion of the grip, an inner portion of the grip having a receiving space penetrating through an inner surface of the grip, the actuating shaft being connected to a middle of an inner surface of a rear wall of the receiving space, the actuating shaft passing through the pivoting tube and the through hole, the pivoting tube being received in the receiving space, at least one portion of an inner surface of a peripheral wall of the receiving space being recessed opposite to the actuating shaft to form at least one buckling groove, the at least one pawl being matched with the at least one buckling groove, the at least one pawl being fastened in the at least one buckling groove, the actuating shaft having a gear arranged at one end of the actuating shaft, a ring groove recessed inward in an outer surface of the actuating shaft, and a fastening rod surrounded by the ring groove, the first rack of the first headband and the second rack of the second headband being both engaged with the gear, the fastening rod being fastened to the opening slot, wherein the first headband and the second headband together surround a wearing space, an overlapping extent of the first headband and the second headband is changed by rotating the knob, so a size of the wearing space is adjusted.

Another object of the present invention is to provide a head-mounted display device. The head-mounted display device, comprising: a displayer; and a headband adjusting module connected to the displayer, the headband adjusting module having a main body, an outer wall of the main body protruding outward to form a pivoting tube, a through hole longitudinally penetrating through the pivoting tube and the outer wall of the main body, the pivoting tube having two pawls, the two pawls being arched outward from an outer surface of the pivoting tube, a baffle, an edge of the radial baffle being recessed inward to form an opening slot, a first headband, one end of the first headband being defined as a first adjusting end, and the other end of the first headband being connected to one side of the displayer, the first adjusting end having a first adjusting groove penetrating through the first headband, an inner wall of the first adjusting groove having a first rack, a second headband, one end of the second headband being defined as a second adjusting end, and the other end of the second headband being connected to the other side of the displayer, the first adjusting end and the second adjusting end being overlapped, and the first adjusting end and the second adjusting end being movably disposed between the main body and the baffle, the second adjusting end having a second adjusting groove penetrating through the second headband, an inner wall of the second adjusting groove having a second rack, the first adjusting groove of the first headband and the second adjusting groove of the second headband being disposed overlapping each other, the first headband and the second headband together surrounding a wearing space, and a knob having a grip and an actuating shaft, an inner portion of the grip having a receiving space penetrating through an inner surface of the grip, the actuating shaft being connected to a middle of an inner surface of a rear wall of the receiving space, the actuating shaft passing through the pivoting tube, the through hole and the main body, the pivoting tube being received in the receiving space, an inner surface of a peripheral wall of the knob being recessed opposite to a center of the knob to form a plurality of buckling grooves, each pawl being buckled in one buckling groove, the actuating shaft having a gear arranged at one end of the actuating shaft and a fastening rod arranged at the other end of the actuating shaft, a diameter of the fastening rod being smaller than a diameter of the actuating shaft, the first rack of the first headband and the second rack of the second headband being both engaged with the gear, the fastening rod being fastened to the opening slot, wherein when the grip of the knob is rotated, the gear rotates between the first rack of the first headband and the second rack of the second headband, the first headband and the second headband move along the gear, and the two pawls are buckled in any two of the plurality of the buckling grooves, so an overlapping length between the first adjusting end and the second adjusting end is adjusted by rotating the grip of the knob, so a size of the wearing space is adjusted.

As described above, the headband adjusting module includes a housing, the base assembled with the housing, and the radial baffle mounted between the housing and the base, a middle of the outer surface of the outer wall of the base protrudes outward to form the pivoting tube, the first adjusting groove of the first headband and the second adjusting groove of the second headband which are disposed overlapping each other are disposed between the base and the radial baffle. Furthermore, the knob is pivotally mounted to the pivoting tube, the actuating shaft has the gear arranged at the one end of the actuating shaft of the knob, the other end of the actuating shaft of the knob is assembled with the radial baffle, the first headband and the second headband together surround the wearing space for fitting to a head of a user, the first rack of the first headband and the second rack of the second headband are both engaged with the gear, the overlapping extent of the first headband and the second headband is changed by rotating the knob, so the size of the wearing space is adjusted according to a size of the head of the user. In addition, the two pawls of the pivoting tube and the two of the plurality of the buckling grooves of the knob are mutually limited to each other, and the two pawls of the pivoting tube and the two of the plurality of the buckling grooves of the knob are fastened with each other, so that an unintended rotation of the knob is prevented being caused, after the overlapping length between the first adjusting end of the first headband and the second adjusting end of the second headband is adjusted, a loosening problem of the first headband and the second headband is prevented from being caused. As a result, the head-mounted display device with the headband adjusting module adjusts the length of the headband which includes the first headband and the second headband, and prevents the headband from loosening.

BRIEF DESCRIPTION OF THE DRAWINGS

The present invention will be apparent to those skilled in the art by reading the following description, with reference to the attached drawings, in which.

DETAILED DESCRIPTION OF THE INVENTION

Figure 1:
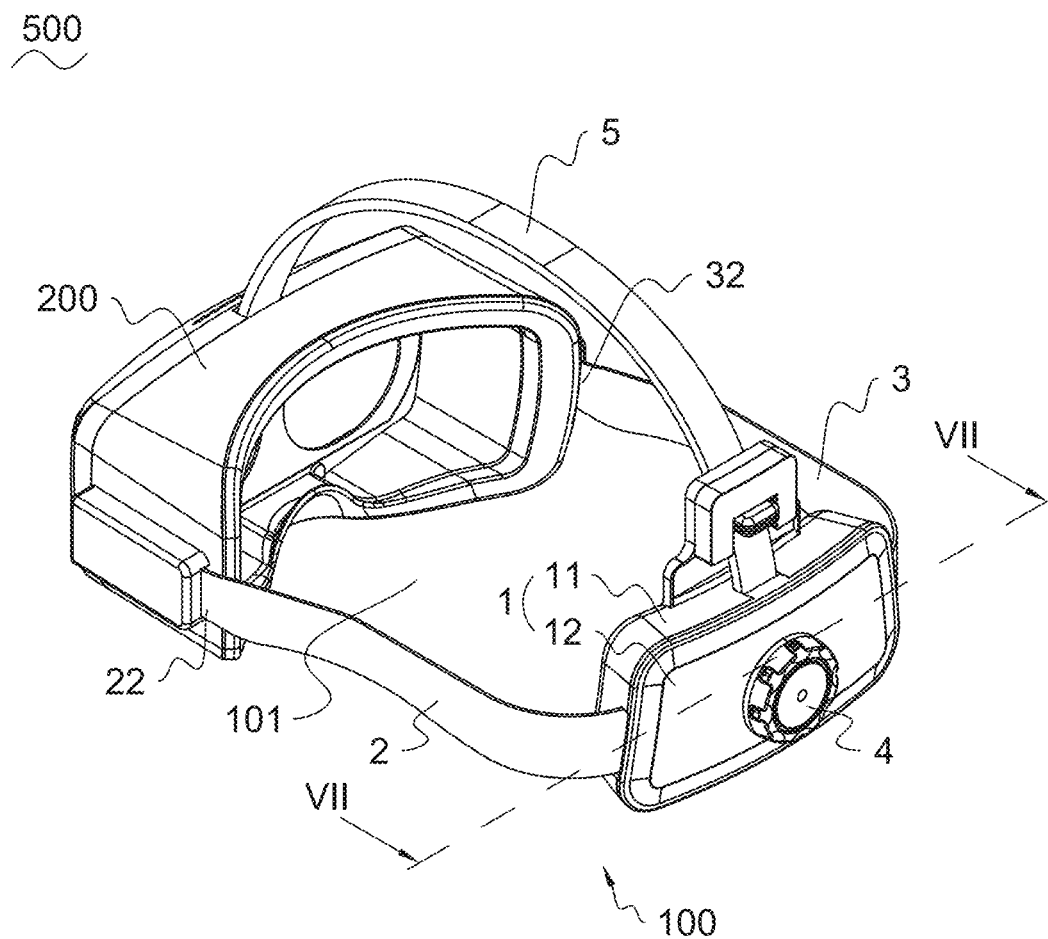
FIG. 1 is a perspective view of a head-mounted display device in accordance with the present invention.
Figure 2:
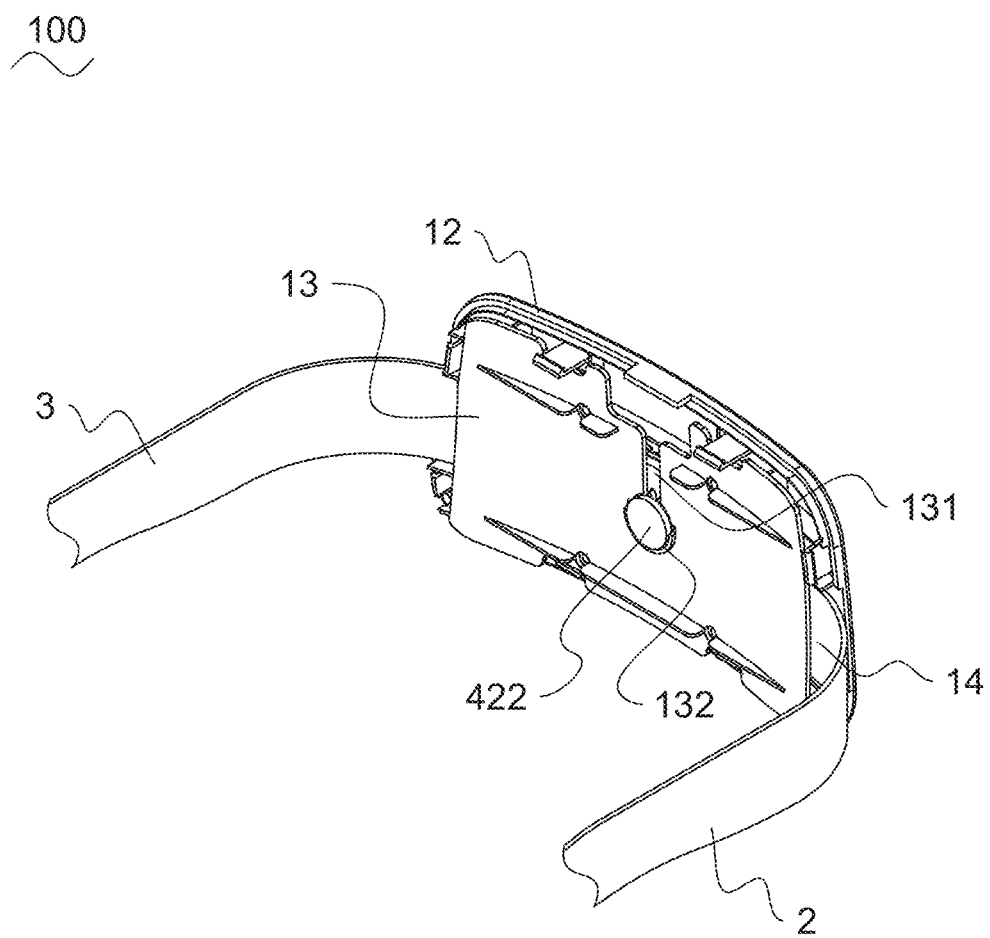
FIG. 2 is a perspective view of a headband adjusting module of the head-mounted display device according to the present invention.

Referring to FIG. 1 to FIG. 4, a head-mounted display device 500 according to the present invention is shown. The head-mounted display device 500 is used in a virtual reality (VR), an augmented reality (AR), a mixed reality (MR), etc. The head-mounted display device 500 includes a headband adjusting module 100 and a displayer 200. The headband adjusting module 100 is connected to the displayer 200. The headband adjusting module 100 is worn on a head of a user. The displayer 200 is fastened in front of two eyes of the user. The headband adjusting module 100 of the head-mounted display device 500 includes a main body 1, a first headband 2, a second headband 3, an upper head strap 5 and a knob 4. One end of the first headband 2 and one end of the second headband 3 are respectively connected with two opposite sides of the headband adjusting module 100. The other end of the first headband 2 and the other end of the second headband 3 are respectively connected with two opposite sides of the displayer 200. The upper head strap 5 is connected between a top of the main body 1 of the headband adjusting module 100 and a top of the displayer 200. The headband adjusting module 100 is worn to a rear, a top and two sides of the head of the user. The first headband 2 and the second headband 3 are worn to the two sides of the head of the user. The main body 1 together with the knob 4 is connected between the first headband 2 and the second headband 3. The main body 1 together with the knob 4 is worn to the rear of the head of the user.

The main body 1 includes a housing 11, a base 12 assembled with the housing 11, a radial baffle 13 mounted between the housing 11 and the base 12. The radial baffle 13 is fastened to an inner wall of the base 12 by a securing unit. The radial baffle 13 is spaced from the inner wall of the base 12, and a containing slot 14 is formed between the inner wall of the base 12 and the radial baffle 13. A middle of an outer surface of an outer wall of the base 12 protrudes outward to form a pivoting tube 15. The base 12 has a through hole 121 longitudinally penetrating through a middle of the base 12. The pivoting tube 15 is protruded outward from an outer surface of a peripheral wall of the through hole 121. The pivoting tube 15 is hollow. A front and a rear of the pivoting tube 15 are opened freely. A middle of the pivoting tube 15 is corresponding to the through hole 121, and the middle of the pivoting tube 15 is communicated with the through hole 121. The pivoting tube 15 has at least one pawl 153 formed on an outer surface of the pivoting tube 15. An outer surface of the at least one pawl 153 is shown as an arc shape. The at least one pawl 153 is elastically deformed along a radial direction of the pivoting tube 15. Specifically, the pivoting tube 15 has two pawls 153. The two pawls 153 are arched outward from a top and a bottom of the outer surface of the pivoting tube 15. Two outer surfaces of the two pawls 153 are shown as two arc shapes. The two pawls 153 are positioned at the middle of the outer surface of the outer wall of the base 12.

The knob 4 is an opened umbrella shape. A middle of an inner portion of the knob 4 faces towards the base 12. The middle of the inner portion of the knob 4 protrudes towards the base 12. At least one portion of an inner surface of a peripheral wall of the knob 4 is recessed opposite to a center of the knob 4 to form at least one buckling groove 412. The at least one buckling groove 412 is shown as the arc shape. The at least one pawl 153 is matched with the at least one buckling groove 412. The at least one pawl 153 is meshed with the at least one buckling groove 412. The at least one pawl 153 is buckled in the at least one buckling groove 412. The at least one pawl 153 is fastened in the at least one buckling groove 412. Specifically, several portions of the inner surface of the peripheral wall of the knob 4 are recessed opposite to the center of the knob 4 to form a plurality of buckling grooves 412. Each pawl 153 is matched with one buckling groove 412. Each pawl 153 is buckled in the one buckling groove 412. Each pawl 153 is meshed with the one buckling groove 412.

The first headband 2 is disposed along an up-down direction. The second headband 3 is disposed along the up-down direction. The one end of the first headband 2 is defined as a first adjusting end 21, and the other end of the first headband 2 is defined as a first connecting end 22. The one end of the second headband 3 is defined as a second adjusting end 31, and the other end of the second headband 3 is defined as a second connecting end 32. The first connecting end 22 and the second connecting end 32 are connected to the two opposite sides of the displayer 200. The first connecting end 22 and the second connecting end 32 are fastened to the two opposite sides of the displayer 200.

Referring to FIG. 1, FIG. 2, FIG. 3 and FIG. 9, the first adjusting end 21 and the second adjusting end 31 are overlapped, and the first adjusting end 21 and the second adjusting end 31 are movably disposed between the base 12 and the radial baffle 13, specifically, the first adjusting end 21 and the second adjusting end 31 are movably disposed in the containing slot 14 which is formed between the base 12 and the radial baffle 13. The knob 4 is pivotally mounted to the pivoting tube 15. The knob 4 is rotatable with respect to the pivoting tube 15. The middle of the inner portion of the knob 4 projects into the pivoting tube 15. The middle of the inner portion of the knob 4 passes through the through hole 121. The middle of the inner portion of the knob 4 is cooperated with the first adjusting end 21 and the second adjusting end 31 which are overlapped. The middle of the inner portion of the knob 4 is assembled with the first adjusting end 21 and the second adjusting end 31 which are overlapped. The first headband 2 and the second headband 3 together surround a wearing space 101 for fitting to the head of the user, an overlapping degree between the first adjusting end 21 and the second adjusting end 31 is changed by rotating the knob 4. Each pawl 153 of the pivoting tube 15 is meshed with the one buckling groove 412 to mutually limit the pivoting tube 15 and the knob 4 to fasten an overlapping position between the first adjusting end 21 and the second adjusting end 31, so that the wearing space 101 is adjusted according to a size of the head of the user, an unintended rotation of the knob 4 is prevented and a change of the wearing space 101 is prevented.

Figure 6:
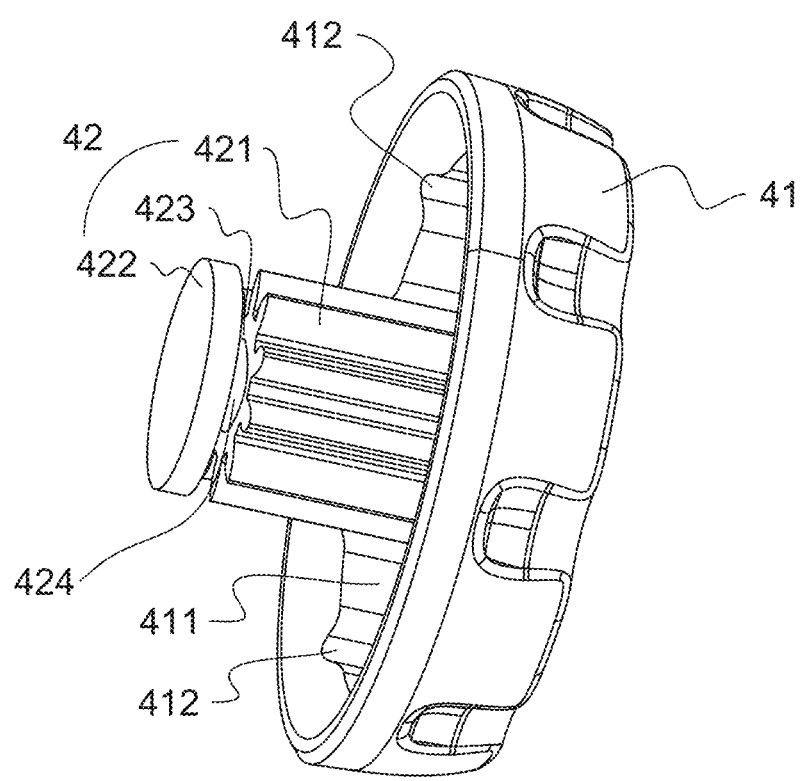
FIG. 6 is a perspective view of a knob of the headband adjusting module of FIG. 4.
Figure 7:
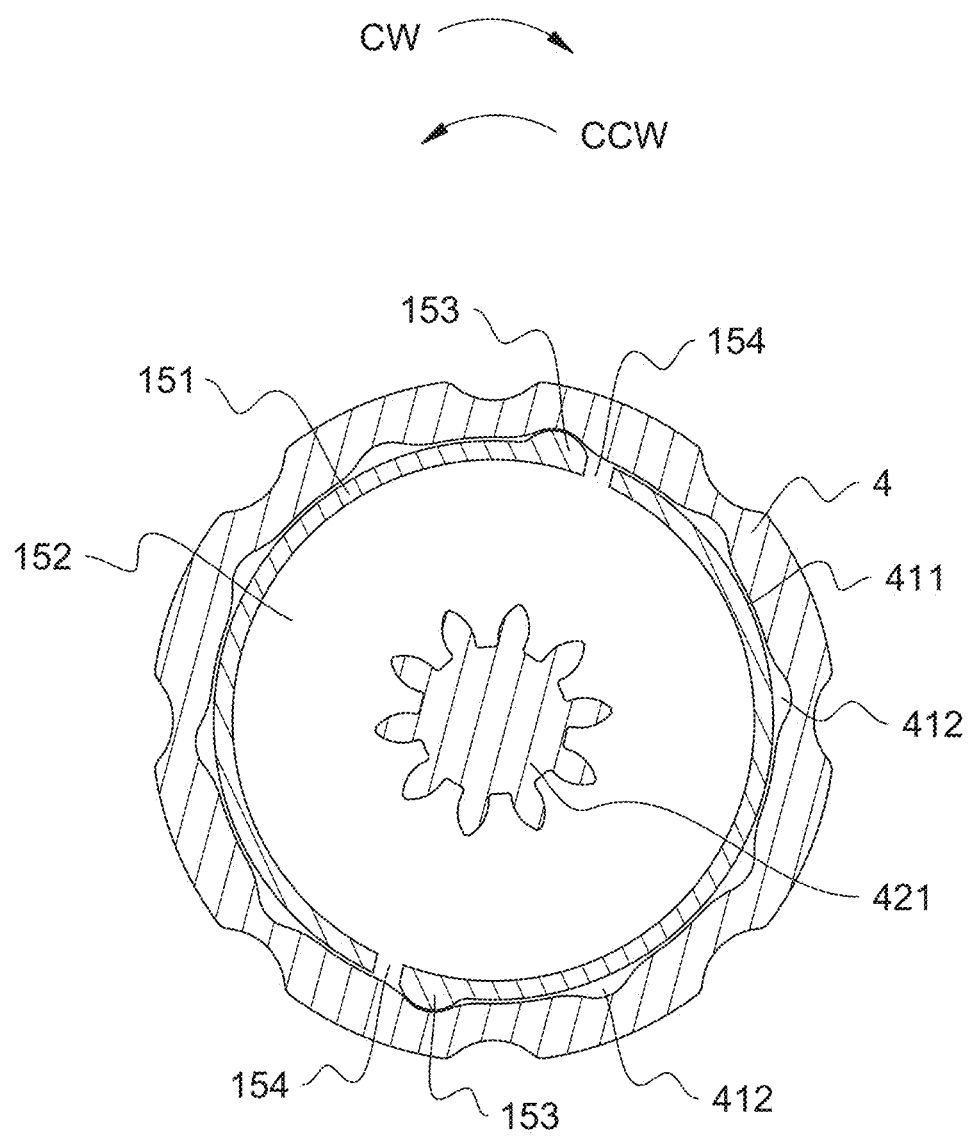
FIG. 7 is a cross-sectional view of the headband adjusting module of the head-mounted display device along a line VII-VII of FIG. 1.

Referring to FIG. 6, the knob 4 has a grip 41, an actuating shaft 42 formed in an inner portion of the grip 41. The grip 41 is shown as a pan shape. The inner portion of the grip 41 has a receiving space 411 penetrating through an inner surface of the grip 41. The actuating shaft 42 is connected to a middle of an inner surface of a rear wall of the receiving space 411. The actuating shaft 42 passes through the pivoting tube 15 and the through hole 121. The pivoting tube 15 is received in the receiving space 411. At least one portion of an inner surface of a peripheral wall of the receiving space 411 is recessed opposite to the actuating shaft 42 to form the at least one buckling groove 412. Several portions of an inner surface of a peripheral wall of the receiving space 411 are recessed opposite to the actuating shaft 42 to form the plurality of the buckling grooves 412. The actuating shaft 42 is a column shape. The actuating shaft 42 of the knob 4 has a gear 421 arranged at one end of the actuating shaft 42 of the knob 4 that is connected to the grip 41, a stopping portion 422 arranged at the other end of the actuating shaft 42 that is away from the grip 41, a ring groove 423 recessed inward in an outer surface of the actuating shaft 42, and a fastening rod 424 surrounded by the ring groove 423. The ring groove 423 is formed between the gear 421 and the stopping portion 422. The other end of the actuating shaft 42 of the knob 4 is assembled with the radial baffle 13. The ring groove 423 is cooperated with the radial baffle 13 for fastening the radial baffle 13.

Figure 3:
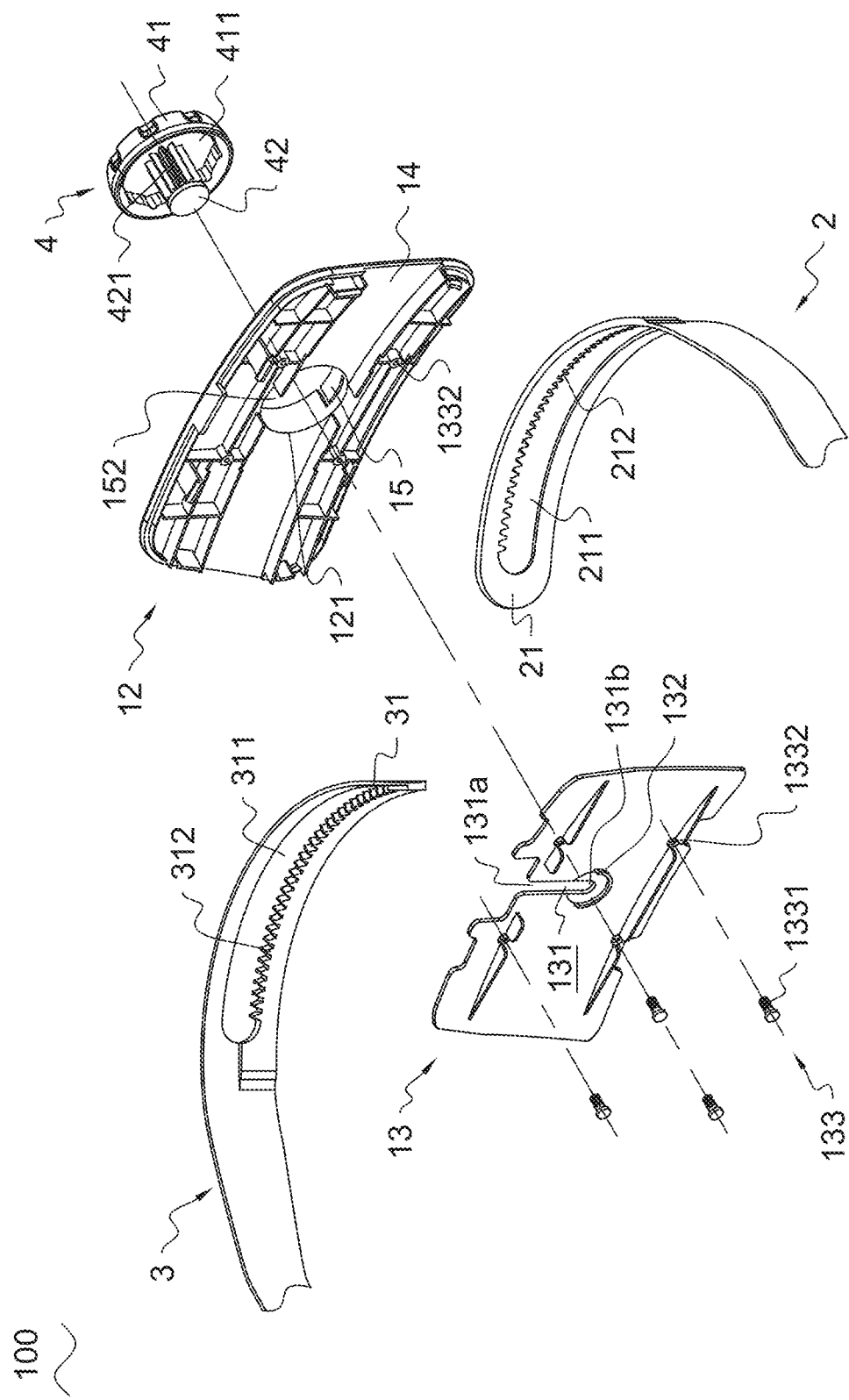
FIG. 3 is an exploded view of the headband adjusting module of the head-mounted display device according to the present invention.
Figure 4:
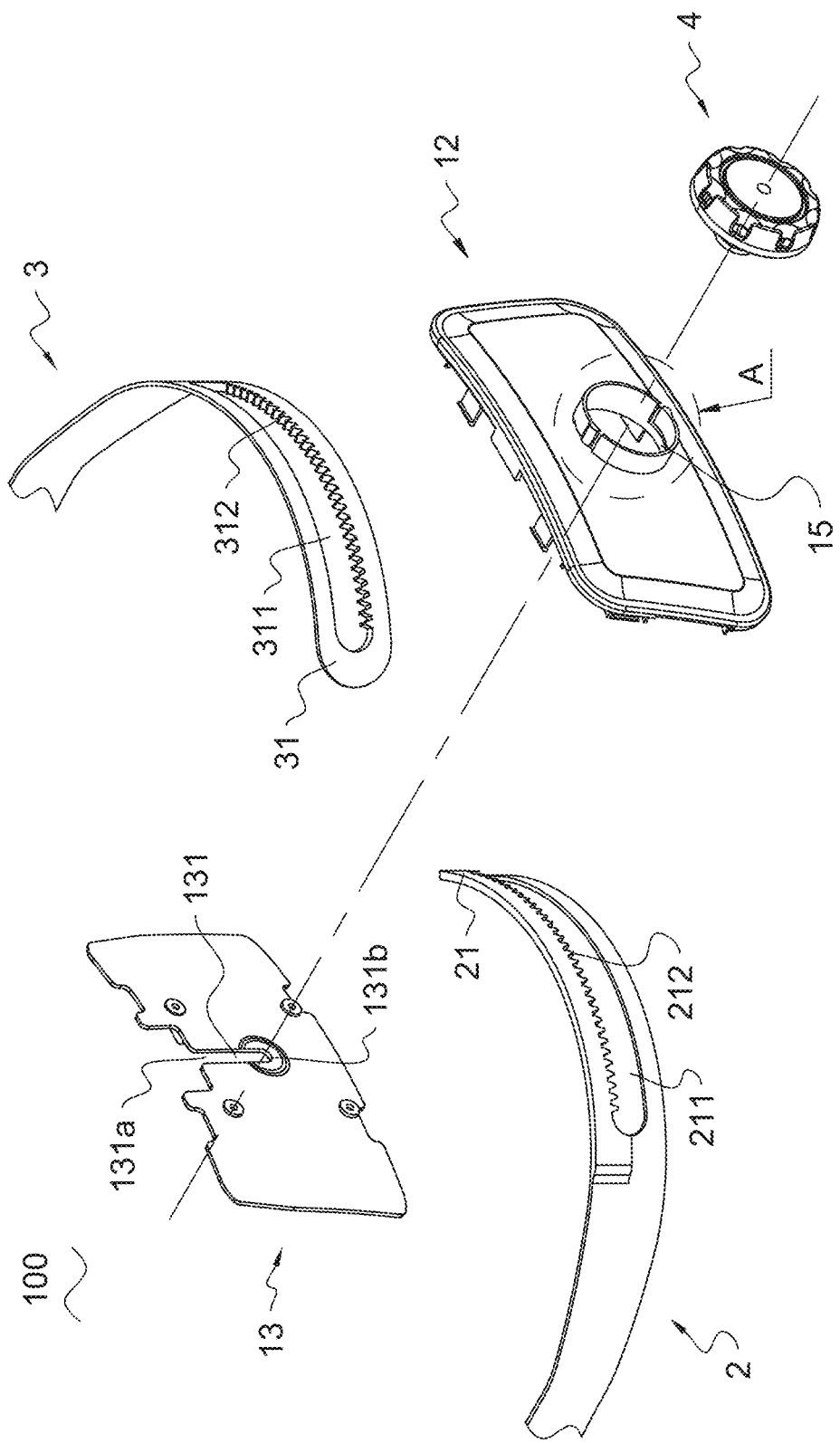
FIG. 4 is another exploded view of the headband adjusting module of the head-mounted display device according to the present invention.
Figure 8:
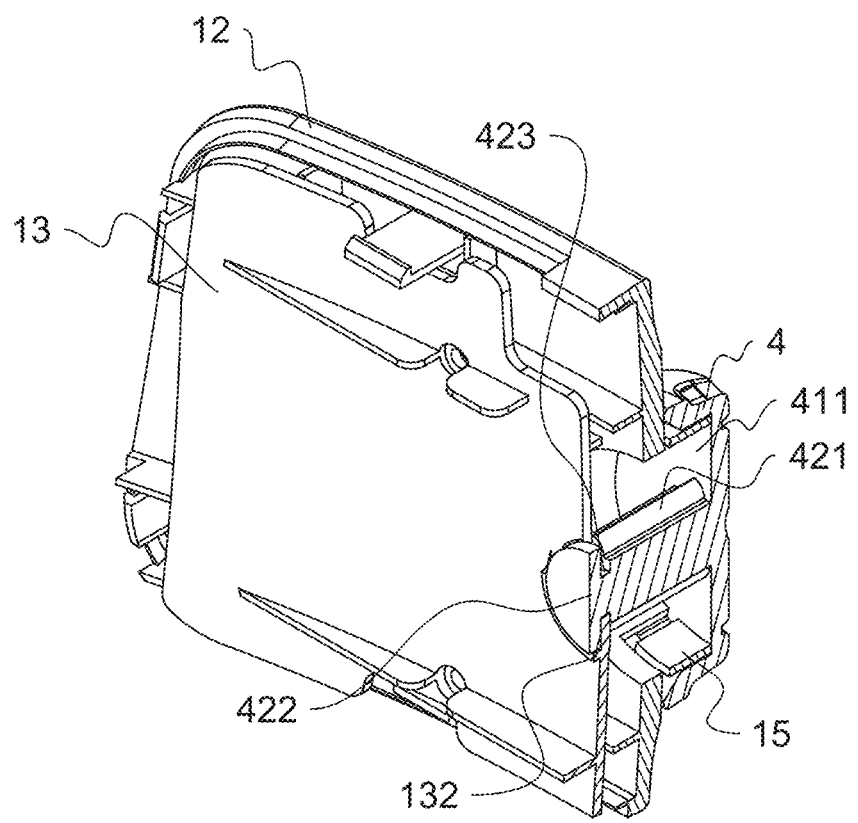
FIG. 8 is a cross-sectional view of a base, a radial baffle and the knob of the headband adjusting module of the head-mounted display device according to the present invention.
Figure 9:
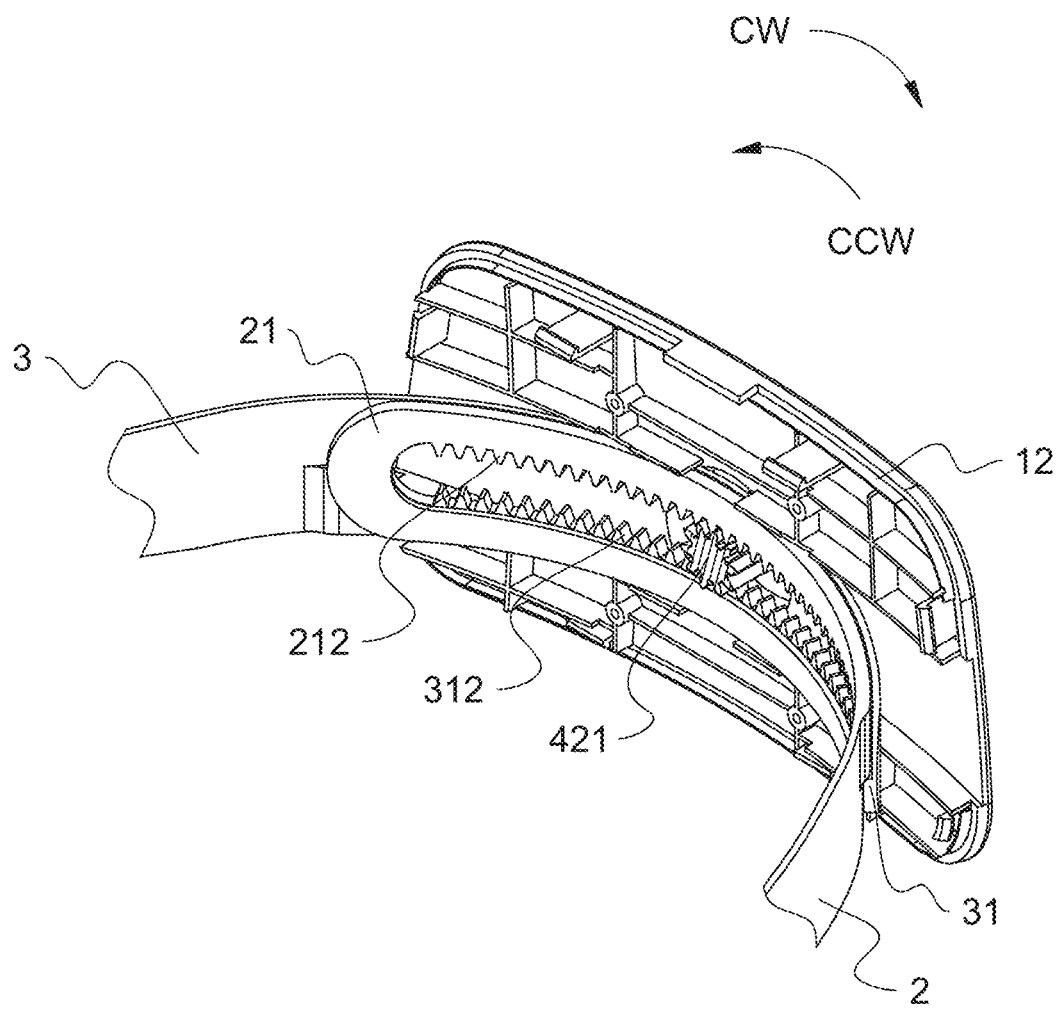
FIG. 9 is a schematic diagram showing that a first rack and a second rack is together engaged with a gear of the headband adjusting module according to the present invention.

Referring to FIG. 3, FIG. 4 and FIG. 8, a middle of a top of the radial baffle 13 is recessed downward to form an opening slot 131. An upper portion of the opening slot 131 is shown as a rectangular shape, and a lower portion of the opening slot 131 is shown as an arched shape. An inner surface of a lower wall of the opening slot 131 protrudes inward and is arched downward to form a supporting rib 132. The supporting rib 132 is formed in a semi-ring shape. A mouth of the supporting rib 132 faces upward. Two side walls of the opening slot 131 are embedded into two sides of the ring groove 423, the two side walls of the opening slot 131 are blocked by the stopping portion 422, and the stopping portion 422 is supported by the supporting rib 132, so that the actuating shaft 42 is assembled with the radial baffle 13, and the actuating shaft 42 is correspondingly combined with the radial baffle 13.

The radial baffle 13 is shown as a rectangle plate structure. The opening slot 131 has an opening end 131a disposed at a top of the opening slot 131, and a fixing end 131b disposed at a bottom of the opening slot 131. The opening end 131a penetrates upward through a middle of a top edge of the radial baffle 13. The fixing end 131b is formed as a semi-circular groove. A center axis of the fixing end 131b is in alignment with a center axis of actuating shaft 42. Preferably, the center axis of the fixing end 131b and the center axis of actuating shaft 42 are the same. The supporting rib 132 is extended frontward from a front surface of the radial baffle 13. The supporting rib 132 surrounds a lower portion of a peripheral wall of the opening slot 131. The supporting rib 132 is disposed around a lower periphery of the fixing end 131b of the opening slot 131. A center axis of the supporting rib 132 is in alignment with the center axis of the actuating shaft 42. Preferably, the center axis of the supporting rib 132 and the center axis of the actuating shaft 42 are the same. The supporting rib 132 is correspondingly positioned under the stopping portion 422, so that the center axis of the actuating shaft 42 and the center axis of the fixing end 131b of the opening slot 131 keep being the same to enhance a stability of a rotation of the knob 4.

The radial baffle 13 is further equipped with a fastener 133 for fastening the base 12 with the radial baffle 13. Specifically, the radial baffle 13 is further equipped with a plurality of fasteners 133. The base 12 is combined with the radial baffle 13 by the plurality of the fasteners 133. The radial baffle 13 is assembled outward to the inner wall of the base 12, and the radial baffle 13 is combined with the actuating shaft 42. The fastening rod 424 of the actuating shaft 42 is assembled to the fixing end 131b of the opening slot 131 through the opening end 131a. The fastening rod 424 of the actuating shaft 42 is fastened to the opening slot 131. The ring groove 423 is combined with two side walls of the fixing end 131b of the opening slot 131. The stopping portion 422 and the gear 421 are respectively mounted to a front surface and a rear surface of the radial baffle 13. An outer diameter of the stopping portion 422 and an outer diameter of the gear 421 are larger than a width of the upper portion of the opening slot 131 and an outer diameter of the lower portion of the opening slot 131 so as to prevent the fastening rod 424 breaking away from the fixing end 131b of the opening slot 131 along an axis direction, and the two side walls of the fixing end 131b are without breaking away from the ring groove 423 along the axis direction. The fastener 133 includes a screw unit 1331, and two screw holes 1332 disposed at the base 12 and the radial baffle 13. The two screw holes 1332 of the base 12 and the radial baffle 13 are mutually aligned with each other, the screw unit 1331 is locked in the two screw holes 1332, so that the radial baffle 13 is fastened to the base 12 by locking the screw unit 1331 in the two screw holes 1332.

Figure 5:
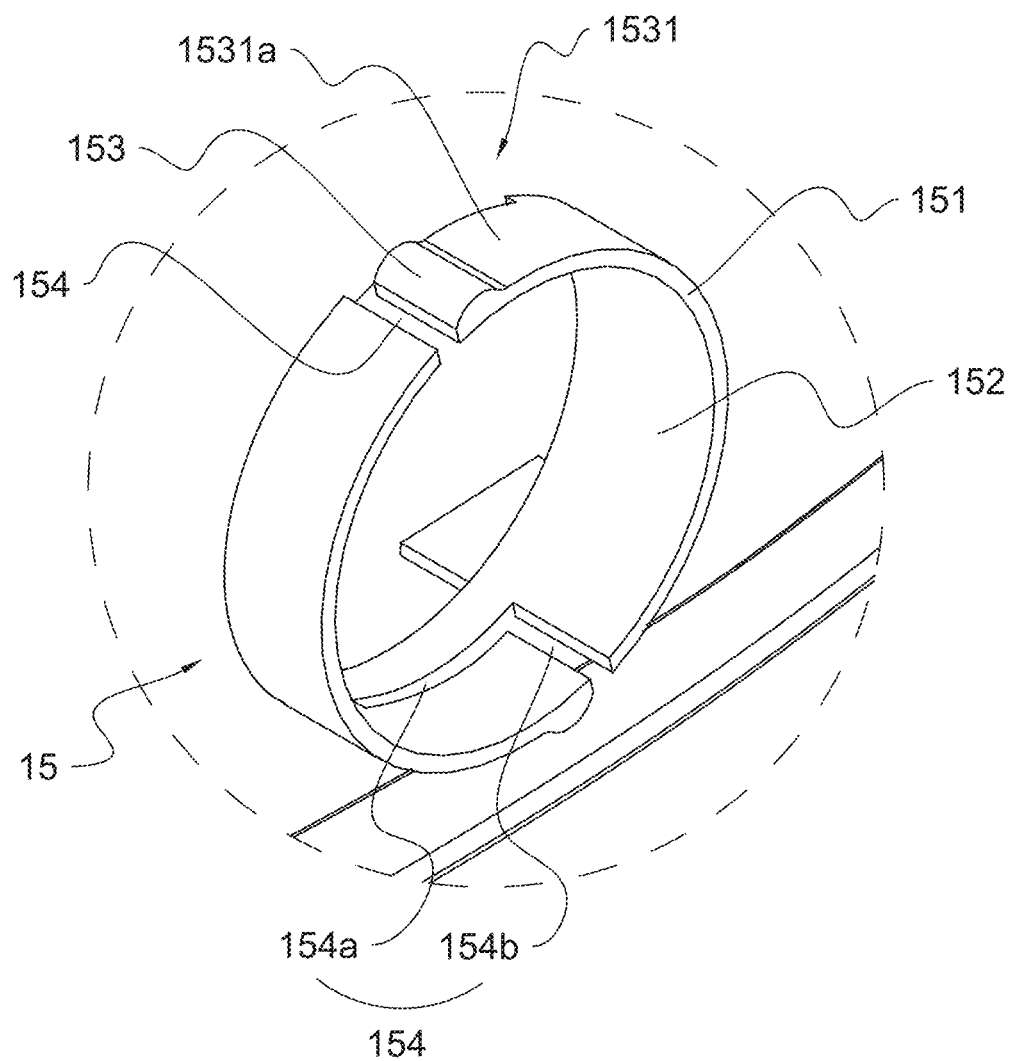
FIG. 5 is an enlarged view of an encircled portion A of the headband adjusting module of FIG. 4.

Referring to FIG. 4 and FIG. 5, the pivoting tube 15 has a nonocclusive circular tube wall 151. A middle of the pivoting tube 15 has a tube hole 152 surrounded by the tube wall 151. The tube hole 152 longitudinally penetrates through the base 12. The tube hole 152 is communicated with the containing slot 14. The two pawls 153 are arched outward from a top and a bottom of an outer surface of the tube wall 151. The two pawls 153 are two elastic structures, and the two pawls 153 are able to elastically move along a radial direction of the pivoting tube 15. The pivoting tube 15 has an elastic arm 1531 formed at the tube wall 151. Specifically, the pivoting tube 15 has two elastic arms 1531 formed at a top and a bottom of the tube wall 151. Each elastic arm 1531 is defined as a resilient portion 1531a. Each elastic arm 1531 extends along an arc direction of the circular tube wall 151. One end of each elastic arm 1531 is a free end, and the free end of each elastic arm 1531 is able to elastically move along a radial direction of the pivoting tube 15. Each pawl 153 is disposed at an outer surface of the free end of one elastic arm 1531. One end of the resilient portion 1531a is a free end, and the free end of the resilient portion 1531a is able to elastically move along the radial direction of the pivoting tube 15. Each pawl 153 is disposed at an outer surface of the free end of the resilient portion 1531a.

The top and the bottom of the tube wall 151 define two cutting slots 154 penetrating through the tube wall 151 along the radial direction of the pivoting tube 15. The two cutting slots 154 surround two inner portions and two free ends of the two elastic arms 1531. The two cutting slots 154 surround two inner portions and two free ends of the two resilient portions 1531a. The two cutting slots 154 are used for increasing radial elastic deformation capacities of the two free ends of the two resilient portions 1531a of the two elastic arms 1531, so that a rotational interference is caused between the two pawls 153 of the pivoting tube 15 and the two buckling grooves 412 of the knob 4. The two cutting slots 154 are shown as two substantially L shapes. Each cutting slot 154 has a first slit 154a extending along the arc direction of the circular tube wall 151, and a second slit 154b extending longitudinally and penetrating through an outer surface of the pivoting tube 15. An inner end of the second slit 154b is connected with one end of the first slit 154a which is adjacent to the free end of the one elastic arm 1531. The two first slits 154a of the two cutting slots 154 are formed at two inner portions of the top and the bottom of the tube wall 151. The two first slits 154a of the two cutting slots 154 are located between the base 12 and two outer portions of the top and the bottom of the tube wall 151 of the pivoting tube 15. The two second slits 154b of the two cutting slots 154 are disposed adjacent to the two pawls 153. The two second slits 154b of the two cutting slots 154 are without being limited to be disposed adjacent to the two pawls 153.

Referring to FIG. 3 and FIG. 4, the first adjusting end 21 has a first adjusting groove 211 penetrating through an outer surface and an inner surface of the first headband 2. Several portions of a single inner wall of the first adjusting groove 211 of the first headband 2 protrude inward to form a first rack 212. Several portions of an upper inner wall of the first adjusting groove 211 protrude downward to form the first rack 212. The second adjusting end 31 has a second adjusting groove 311 penetrating through an outer surface and an inner surface of the second headband 3. Several portions of a single inner wall of the second adjusting groove 311 protrude inward to form a second rack 312. Several portions of a lower inner wall of the second adjusting groove 311 of the second headband 3 protrude upward to form the second rack 312. The first adjusting groove 211 of the first headband 2 and the second adjusting groove 311 of the second headband 3 are disposed overlapping each other. The first adjusting groove 211 of the first headband 2 and the second adjusting groove 311 of the second headband 3 are disposed between the base 12 and the radial baffle 13. The first rack 212 and the second rack 312 are disposed corresponding to each other. A bending direction of the first rack 212 is the same as a bending direction of the second rack 312. The first rack 212 of the first headband 2 and the second rack 312 of the second headband 3 are both engaged with the gear 421. The first rack 212 is opposite to the second rack 312.

The actuating shaft 42 passes through the first adjusting groove 211 and the second adjusting groove 311 which overlap each other to ensure that the gear 421 is engaged with both the first rack 212 and the second rack 312. The second headband 3 is disposed adjacent to an inner surface of the base 12. The first headband 2 is disposed adjacent to a rear surface of the radial baffle 13, and the first headband 2 overlaps with a front surface of the second headband 3. The first rack 212 and the second rack 312 are formed in a direction of an overlapping area between the first headband 2 and the second headband 3. In other words, the first headband 2 is overlapped on the front surface of the second headband 3, the first rack 212 of the first headband 2 faces towards a lower inner wall of the first adjusting groove 211 and the second rack 312 of the second headband 3, and the second rack 312 faces towards an upper inner wall of the second adjusting groove 311 and the first rack 212 of the first headband 2. The first rack 212 of the first headband 2 and the upper inner wall of the second adjusting groove 311 are abreast disposed opposite to the lower inner wall of the first adjusting groove 211 and the second rack 312 of the second headband 3. The first rack 212 extends along the second headband 3. The second rack 312 extends along the first headband 2. The first rack 212 of the first headband 2 and the upper inner wall of the second adjusting groove 311 are corresponding to the lower inner wall of the first adjusting groove 211 and the second rack 312 of the second headband 3. The first rack 212 is disposed in front of the second rack 312.

Referring to FIG. 1 to FIG. 9, the first rack 212 is correspondingly engaged with a top of the gear 421, and the second rack 312 is correspondingly engaged with a bottom of the gear 421. The first rack 212 and the second rack 312 are connected to the knob 4, so an overlapping length between the first adjusting end 21 and the second adjusting end 31 is adjusted by rotating the gear 421, and the wearing space 101 which is formed between the first headband 2 and the second headband 3 is adjusted. The knob 4 is rotated to drive the gear 421 to rotate, the first rack 212 and the second rack 312 move oppositely with the rotation of the gear 421 to adjust the overlapping length between the first adjusting end 21 and the second adjusting end 31, so the wearing space 101 surrounded by the first headband 2 and the second headband 3 is changed. An overlapping extent of the first headband 2 and the second headband 3 is changed by rotating the knob 4, so a size of the wearing space 101 is adjusted according to the size of the head of the user.

When the gear 421 rotates in a clockwise (CW) direction, the first headband 2 moves to a right side of the headband adjusting module 100, and the second headband 3 moves to a left side of the headband adjusting module 100 at the same time to reduce the overlapping length between the first adjusting end 21 and the second adjusting end 31, and then the wearing space 101 is enlarged.

Conversely, when the gear 421 rotates in a counterclockwise (CCW) direction, the first headband 2 moves to the left side of the headband adjusting module 100 and the second headband 3 moves to the right side of the headband adjusting module 100 at the same time to increase the overlapping length between the first adjusting end 21 and the second adjusting end 31, and then the wearing space 101 is reduced.

In a concrete implementation, when the user wears the head-mounted display device 500, the user is able to rotate the grip 41 of the knob 4 to adjust the wearing space 101 according to the size of the head of the user, so the wearing space 101 is appropriate for a head circumference of the user. The first headband 2 and the second headband 3 are flexible bands, so the first headband 2 and the second headband 3 are bendable, and the first headband 2 and the second headband 3 are adhered to the head of the user along a shape of the head circumference of the user.

Referring to FIG. 1 to FIG. 9 again, when the grip 41 of the knob 4 is rotated, the gear 421 rotates between the first rack 212 of the first headband 2 and the second rack 312 of the second headband 3, the first headband 2 and the second headband 3 move along the gear 421, and the two pawls 153 are buckled in any two of the plurality of the buckling grooves 412, so the overlapping length between the first adjusting end 21 and the second adjusting end 31 is adjusted by rotating the grip 41 of the knob 4, and the overlapping length between the first adjusting end 21 and the second adjusting end 31 is secured by a mutual restriction of the knob 4 and the pivoting tube 15. In this way, an unintended rotation of the knob 4 is prevented being caused, after the overlapping length between the first adjusting end 21 of the first headband 2 and the second adjusting end 31 of the second headband 3 is adjusted, a loosening problem of the first headband 2 and the second headband 3 is prevented from being caused.

In the concrete implementation, the knob 4 is able to rotate in the clockwise (CW) direction or counterclockwise direction. The knob 4 is pivotally mounted to the pivoting tube 15. The peripheral wall of the receiving space 411 surrounds an outer surface of the tube wall 151, so that the grip 41 is assembled with the pivoting tube 15. When the two pawls 153 of the pivoting tube 15 are interfered with side walls of the plurality of the buckling grooves 412 of the knob 4 in a rotation process of the grip 41, the two pawls 153 of the free ends of the two elastic arms 1531 are able to shrink inward to be deformed along the radial direction of the pivoting tube 15, so the peripheral wall of the receiving space 411 of the grip 41 moves across the two pawls 153 of the two elastic arms 1531 of the pivoting tube 15 without a rotating interference influence of the two pawls 153 of the pivoting tube 15 and the side walls of the plurality of the buckling grooves 412 of the knob 4.

When the two pawls 153 rebound to original positions along the radial direction of the pivoting tube 15, the two pawls 153 are buckled with two of the plurality of the buckling grooves 412, so the knob 4 and the pivoting tube 15 are mutually limited to each other, and the knob 4 and the pivoting tube 15 are mutually fastened with each other. Ten buckling grooves 412 are recessed in the inner surface of the peripheral wall of the receiving space 411. The ten buckling grooves 412 are arranged at equal intervals. The two pawl arms 153 are positioned at the tube wall 151 diagonally, so that the two pawl arms 153 are correspondingly buckled to the two buckling grooves 412 positioned diagonally at the inner surface of the peripheral wall of the receiving space 411 of the grip 41, in that case, when the grip 41 of the knob 4 rotates thirty-six degrees, a locating effect between the knob 4 and the pivoting tube 15 is achieved.

As described above, the headband adjusting module 100 includes the housing 11, the base 12 assembled with the housing 11, and the radial baffle 13 mounted between the housing 11 and the base 12, the middle of the outer surface of the outer wall of the base 12 protrudes outward to form the pivoting tube 15, the first adjusting groove 211 of the first headband 2 and the second adjusting groove 311 of the second headband 3 which are disposed overlapping each other are disposed between the base 12 and the radial baffle 13. Furthermore, the knob 4 is pivotally mounted to the pivoting tube 15, the actuating shaft 42 has the gear 421 arranged at the one end of the actuating shaft 42 of the knob 4, the other end of the actuating shaft 42 of the knob 4 is assembled with the radial baffle 13, the first headband 2 and the second headband 3 together surround the wearing space 101 for fitting to the head of the user, the first rack 212 of the first headband 2 and the second rack 312 of the second headband 3 are both engaged with the gear 421, the overlapping extent of the first headband 2 and the second headband 3 is changed by rotating the knob 4, so the size of the wearing space 101 is adjusted according to the size of the head of the user. In addition, the two pawls 153 of the pivoting tube 15 and the two of the plurality of the buckling grooves 412 of the knob 4 are mutually limited to each other, and the two pawls 153 of the pivoting tube 15 and the two of the plurality of the buckling grooves 412 of the knob 4 are fastened with each other, so that the unintended rotation of the knob 4 is prevented being caused, after the overlapping length between the first adjusting end 21 of the first headband 2 and the second adjusting end 31 of the second headband 3 is adjusted, the loosening problem of the first headband 2 and the second headband 3 is prevented from being caused. As a result, the head-mounted display device 500 with the headband adjusting module 100 adjusts a length of a headband which includes the first headband 2 and the second headband 3, and prevents the headband from loosening.

What is claimed is:
1. A headband adjusting module, comprising:
a main body having a through hole longitudinally penetrating through a middle of the main body, an outer surface of an outer wall of the main body protruding outward to form a pivoting tube, the pivoting tube being hollow, a front and a rear of the pivoting tube being opened freely, the pivoting tube having at least one pawl formed on an outer surface of the pivoting tube, a middle of the pivoting tube being corresponding to the through hole, and the middle of the pivoting tube being communicated with the through hole;
a radial baffle, a middle of a top of the radial baffle being recessed downward to form an opening slot, the radial baffle being equipped with a fastener for fastening the main body with the radial baffle;
a first headband, one end of the first headband being defined as a first adjusting end, the first adjusting end having a first adjusting groove penetrating through an outer surface and an inner surface of the first headband, and several portions of a single inner wall of the first adjusting groove protruding inward to form a first rack;
a second headband, one end of the second headband being defined as a second adjusting end, the first adjusting end and the second adjusting end being overlapped, and the first adjusting end and the second adjusting end being movably disposed between the main body and the radial baffle, the second adjusting end having a second adjusting groove penetrating through an outer surface and an inner surface of the second headband, several portions of a single inner wall of the second adjusting groove protruding inward to form a second rack, the first adjusting groove of the first headband and the second adjusting groove of the second headband being disposed overlapping each other, the first rack being opposite to the second rack, and a bending direction of the first rack being the same as a bending direction of the second rack; and a knob having a grip and an actuating shaft, an inner portion of the grip having a receiving space penetrating through an inner surface of the grip, the actuating shaft being connected to a middle of an inner surface of a rear wall of the receiving space, the actuating shaft passing through the pivoting tube and the through hole, the pivoting tube being received in the receiving space, at least one portion of an inner surface of a peripheral wall of the receiving space being recessed opposite to the actuating shaft to form at least one buckling groove, the at least one pawl being matched with the at least one buckling groove, the at least one pawl being fastened in the at least one buckling groove, the actuating shaft having a gear arranged at one end of the actuating shaft, a ring groove recessed inward in an outer surface of the actuating shaft, and a fastening rod surrounded by the ring groove, the first rack of the first headband and the second rack of the second headband being both engaged with the gear, and the fastening rod being fastened to the opening slot, wherein the first headband and the second headband together surround a wearing space, and an overlapping extent of the first headband and the second headband is changed by rotating the knob, so that a size of the wearing space is adjusted.

2. The headband adjusting module as claimed in claim 1, wherein an inner surface of a lower wall of the opening slot protrudes inward and is arched downward to form a supporting rib, the supporting rib is formed in a semi-ring shape, a mouth of the supporting rib faces upward, the supporting rib surrounds a lower portion of a peripheral wall of the opening slot, and a center axis of the supporting rib is in alignment with a center axis of the actuating shaft.

3. The headband adjusting module as claimed in claim 2, wherein the center axis of the supporting rib and the center axis of the actuating shaft are the same.

4. The headband adjusting module as claimed in claim 2, wherein the actuating shaft of the knob has the gear arranged at the one end of the actuating shaft that is connected to the grip, and a stopping portion arranged at the other end of the actuating shaft that is away from the grip, the ring groove is formed between the gear and the stopping portion, an upper portion of the opening slot is shown as a rectangular shape, and a lower portion of the opening slot is shown as an arched shape, an outer diameter of the stopping portion and an outer diameter of the gear are larger than a width of the upper portion of the opening slot and an outer diameter of the lower portion of the opening slot, and the supporting rib is correspondingly positioned under the stopping portion.

5. The headband adjusting module as claimed in claim 1, wherein the fastener includes a screw unit, and two screw holes disposed at the main body and the radial baffle, the two screw holes of the main body and the radial baffle are mutually aligned with each other, and the screw unit is locked in the two screw holes.

6. The headband adjusting module as claimed in claim 1, wherein the pivoting tube has two pawls, the two pawls are arched outward from a top and a bottom of the outer surface of the pivoting tube, the two pawls are two elastic structures, the pivoting tube has a nonocclusive circular tube wall, the pivoting tube has two elastic arms formed at a top and a bottom of the tube wall, each elastic arm extends along an arc direction of the circular tube wall, one end of each elastic arm is a free end, and the free end of each elastic arm is able to elastically move along a radial direction of the pivoting tube, and each pawl is disposed at an outer surface of the free end of one elastic arm.

7. The headband adjusting module as claimed in claim 6, wherein two outer surfaces of the two pawls are shown as two arc shapes.

8. The headband adjusting module as claimed in claim 6, wherein the top and the bottom of the tube wall define two cutting slots penetrating through the tube wall along the radial direction of the pivoting tube, and the two cutting slots surround two inner portions and two free ends of the two elastic arms.

9. The headband adjusting module as claimed in claim 8, wherein the two cutting slots are shown as two substantially L shapes.

10. The headband adjusting module as claimed in claim 8, wherein each cutting slot has a first slit extending along the arc direction of the circular tube wall, and a second slit extending longitudinally and penetrating through an outer surface of the pivoting tube, an inner end of the second slit is connected with one end of the first slit which is adjacent to the free end of the one elastic arm, the two first slits of the two cutting slots are formed at two inner portions of the top and the bottom of the tube wall, the two first slits of the two cutting slots are located between the main body and two outer portions of the top and the bottom of the tube wall of the pivoting tube, and the two second slits of the two cutting slots are disposed adjacent to the two pawls.

11. The headband adjusting module as claimed in claim 1, wherein the first rack is correspondingly engaged with a top of the gear, and the second rack is correspondingly engaged with a bottom of the gear.

12. The headband adjusting module as claimed in claim 1, wherein the second headband is disposed adjacent to an inner surface of the main body, the first headband is disposed adjacent to a rear surface of the radial baffle, and the first headband overlaps with a front surface of the second headband, the first rack faces towards a lower inner wall of the first adjusting groove and the second rack of the second headband, and the second rack faces towards an upper inner wall of the second adjusting groove and the first rack of the first headband, the first rack and the upper inner wall of the second adjusting groove are abreast disposed opposite to the lower inner wall of the first adjusting groove and the second rack, the first rack extends along the second headband, the second rack extends along the first headband, and the first rack and the upper inner wall of the second adjusting groove are corresponding to the lower inner wall of the first adjusting groove and the second rack.

13. A head-mounted display device, comprising:
a displayer;
a main body having a through hole longitudinally penetrating through a middle of the main body, an outer surface of an outer wall of the main body protruding outward to form a pivoting tube, the pivoting tube being hollow, a front and a rear of the pivoting tube being opened freely, the pivoting tube having at least one pawl formed on an outer surface of the pivoting tube, and a middle of the pivoting tube being communicated with the through hole;
a radial baffle, a middle of a top of the radial baffle being recessed downward to form an opening slot;
a first headband, one end of the first headband being defined as a first adjusting end, and the other end of the first headband being defined as a first connecting end, the first adjusting end having a first adjusting groove penetrating through an outer surface and an inner surface of the first headband, and several portions of a single inner wall of the first adjusting groove protruding inward to form a first rack;

a second headband, one end of the second headband being defined as a second adjusting end, and the other end of the second headband being defined as a second connecting end, the first adjusting end and the second adjusting end being overlapped, and the first adjusting end and the second adjusting end being movably disposed between the main body and the radial baffle, the second adjusting end having a second adjusting groove penetrating through an outer surface and an inner surface of the second headband, several portions of a single inner wall of the second adjusting groove protruding inward to form a second rack, the first adjusting groove of the first headband and the second adjusting groove of the second headband being disposed overlapping each other, the first rack being opposite to the second rack, a bending direction of the first rack being the same as a bending direction of the second rack, and the first connecting end and the second connecting end being connected to two opposite sides of the displayer; and a knob having a grip, and an actuating shaft formed in an inner portion of the grip, an inner portion of the grip having a receiving space penetrating through an inner surface of the grip, the actuating shaft being connected to a middle of an inner surface of a rear wall of the receiving space, the actuating shaft passing through the pivoting tube and the through hole, the pivoting tube being received in the receiving space, at least one portion of an inner surface of a peripheral wall of the receiving space being recessed opposite to the actuating shaft to form at least one buckling groove, the at least one pawl being matched with the at least one buckling groove, the at least one pawl being fastened in the at least one buckling groove, the actuating shaft having a gear arranged at one end of the actuating shaft, a ring groove recessed inward in an outer surface of the actuating shaft, and a fastening rod surrounded by the ring groove, the first rack of the first headband and the second rack of the second headband being both engaged with the gear, and the fastening rod being fastened to the opening slot, wherein the first headband and the second headband together surround a wearing space, and an overlapping extent of the first headband and the second headband is changed by rotating the knob, so that a size of the wearing space is adjusted.

14. A head-mounted display device, comprising:
a displayer; and
a headband adjusting module connected to the displayer, the headband adjusting module having:
a main body, an outer wall of the main body protruding outward to form a pivoting tube, a through hole longitudinally penetrating through the pivoting tube and the outer wall of the main body, the pivoting tube having two pawls, and the two pawls being arched outward from an outer surface of the pivoting tube;
a baffle, an edge of the radial baffle being recessed inward to form an opening slot;
a first headband, one end of the first headband being defined as a first adjusting end, and the other end of the first headband being connected to one side of the displayer, the first adjusting end having a first adjusting groove penetrating through the first headband, and an inner wall of the first adjusting groove having a first rack;

a second headband, one end of the second headband being defined as a second adjusting end, and the other end of the second headband being connected to the other side of the displayer, the first adjusting end and the second adjusting end being overlapped, and the first adjusting end and the second adjusting end being movably disposed between the main body and the baffle, the second adjusting end having a second adjusting groove penetrating through the second headband, an inner wall of the second adjusting groove having a second rack, the first adjusting groove of the first headband and the second adjusting groove of the second headband being disposed overlapping each other, and the first headband and the second headband together surrounding a wearing space; and a knob having a grip and an actuating shaft, an inner portion of the grip having a receiving space penetrating through an inner surface of the grip, the actuating shaft being connected to a middle of an inner surface of a rear wall of the receiving space, the actuating shaft passing through the pivoting tube, the through hole and the main body, the pivoting tube being received in the receiving space, an inner surface of a peripheral wall of the knob being recessed opposite to a center of the knob to form a plurality of buckling grooves, each pawl being buckled in one buckling groove, the actuating shaft having a gear arranged at one end of the actuating shaft and a fastening rod arranged at the other end of the actuating shaft, a diameter of the fastening rod being smaller than a diameter of the actuating shaft, the first rack of the first headband and the second rack of the second headband being both engaged with the gear, and the fastening rod being fastened to the opening slot, wherein when the grip of the knob is rotated, the gear rotates between the first rack of the first headband and the second rack of the second headband, the first headband and the second headband move along the gear, and the two pawls are buckled in any two of the plurality of the buckling grooves, so that an overlapping length between the first adjusting end and the second adjusting end is adjusted by rotating the grip of the knob, and a size of the wearing space is adjusted.

15. The head-mounted display device as claimed in claim 14, wherein the actuating shaft of the knob has the gear arranged at the one end of the actuating shaft that is connected to the grip, and a stopping portion arranged at the other end of the actuating shaft that is away from the grip, a ring groove is recessed from an outer surface to form the fastening rod, the fastening rod is formed between the gear and the stopping portion, an outer portion of the opening slot is shown as a rectangular shape, and an inner portion of the opening slot is shown as an arched shape, and an outer diameter of the stopping portion and an outer diameter of the gear are larger than a width of the outer portion of the opening slot and an outer diameter of the inner portion of the opening slot.

* * * * *